UNITED STATES PATENT OFFICE.

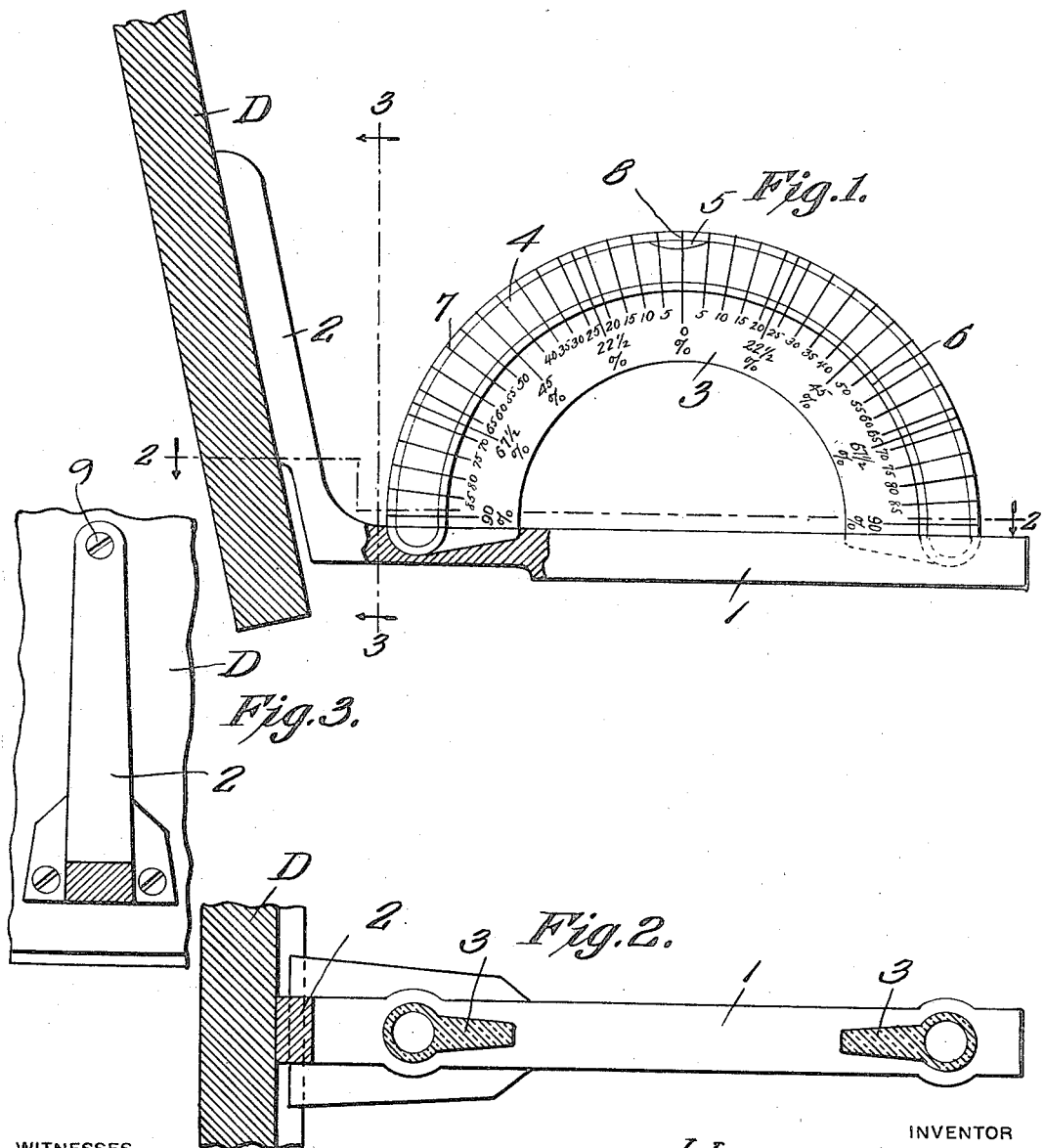

HENRY HENCH, OF SWEET, IDAHO.

GRADE-MEASURING INSTRUMENT.

1,255,744. Specification of Letters Patent. Patented Feb. 5, 1918.

Application filed June 21, 1917. Serial No. 176,143.

*To all whom it may concern:*

Be it known that I, HENRY HENCH, a citizen of the United States, residing at Sweet, in the county of Gem and State of Idaho, have invented certain new and useful Improvements in Grade-Measuring Instruments, of which the following is a specification.

This invention relates to instruments for measuring and indicating grades and is especially designed for use on motor vehicles.

The object of the invention is to provide a simply constructed device of this character for attachment to an automobile which will register the incline of the grade, either up or down, over which the vehicle travels so that the driver may tell at a glance the grade of a hill his car is climbing.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation partly in section of a measuring instrument constructed in accordance with this invention and shown applied, Fig. 2 is a horizontal section taken on the line 2—2 of Fig. 1, and Fig. 3 is a vertical section taken on the line 3—3 of Fig. 1.

In the embodiment illustrated, the device constituting this invention comprises a support in the form of a plate 1 having an upstanding obliquely disposed arm 2 at one end thereof for connection to the dash board D of a vehicle so that the plate 1 will be held parallel with the plane of the bottom and running gear of the vehicle.

Carried by plate 1 is an upstanding semi-circular frame 3 which is preferably of the cross sectional contour shown in Fig. 2 and is designed to support on its outer edge or periphery a semi-circular spirit level tube 4 which is partially filled with spirit or other proper liquid, an air bubble being left within the tube as indicated by dotted lines at 5 in Fig. 1. This tube 4 is held in place within a seat 6 formed in said frame 3 and may be secured therein by cementing or any suitable means.

The frame 3 has a series of graduations thereon as shown at 7 which extends also transversely across the tube 4 and indicates the grade of a hill over which the vehicle equipped with this attachment is traveling. These degrees are marked from the vertical center of the plate as shown at 8 downward in opposite directions.

An inspection of Fig. 1 will show that the tube 4 is visible above plate or frame 3 and it will be understood that by tilting the plate 1 toward either end, which is occasioned by the vehicle passing up or down a grade, the bubble 5 will show exactly the inclination of the grade over which the vehicle is passing, it of course being understood that the graduations on plate 3 and tube 4 have been properly determined before the device is placed on the vehicle.

The arm 2 is provided with suitable attaching means which are here shown in the form of apertures through which screws 9 pass for securing the device securely to the dash board and it is to be understood that this attachment is preferably placed adjacent the speedometer at any convenient position to be seen by the driver.

From the foregoing description, taken in connection with the accompanying drawings, the advantages of the construction and of the method of operation will be readily apparent to those skilled in the art to which the invention appertains, and while I have described the principle of operation of the invention together with the device which I now consider to be the best embodiment thereof, I desire to have it understood that the device shown is merely illustrative and that such changes may be made as are within the scope of the claimed invention.

I claim:—

1. A device of the class described comprising a base plate having an arm extending upwardly and outwardly at an oblique angle and provided with means for attaching it to a support, a semi-circular frame carried by the upper face of said base plate with its curved portion extending outwardly, a spirit tube corresponding in shape to said frame and secured to the periphery thereof, said frame having graduations marked thereon and on said tube to indicate the grade over which the vehicle equipped with this device is traveling.

2. A device of the class described comprising a plate having attaching means, a semi-circular frame secured at its ends to said plate and rising therefrom, said frame tapering in thickness from its perimeter inward, a seat formed around the periphery of said frame, a semi-circular spirit tube mounted in said seat, said frame having graduations formed thereon and on said tube for indicating the grade over which the vehicle equipped with this device is passing, said graduations extending in opposite directions from the center of said tube.

In testimony whereof I affix my signature in presence of two witnesses.

HENRY HENCH.

Witnesses:
R. E. NOLAND,
WM. IRETON.